Oct. 30, 1951  T. R. RYMAL  2,572,952
SELF-LUBRICATING PISTON ROD
Filed Sept. 2, 1947

Inventor
Theodore R. Rymal

By
Ranseler O. Wyatt

Patented Oct. 30, 1951

2,572,952

UNITED STATES PATENT OFFICE 2,572,952

SELF-LUBRICATING PISTON ROD

Theodore R. Rymal, Houston, Tex.

Application September 2, 1947, Serial No. 771,581

6 Claims. (Cl. 286—19)

1

This invention relates to a new and useful improvement in a self-lubricating piston rod for use on the piston rods of slush pumps and the like.

An object of the invention is to provide a self-lubricating piston rod for use on slush pumps and the like that will maintain a circulation of lubricating oil on the piston rod, greatly reducing the wear on the packing material in the stuffing box of a slush pump.

Another object of the invention is to provide a device of the character described employing novel means of controlling the flow of lubricating oil over the piston rod.

The above and other objects will be apparent from the following description and illustrated in the accompanying drawings, wherein.

Figure 1:
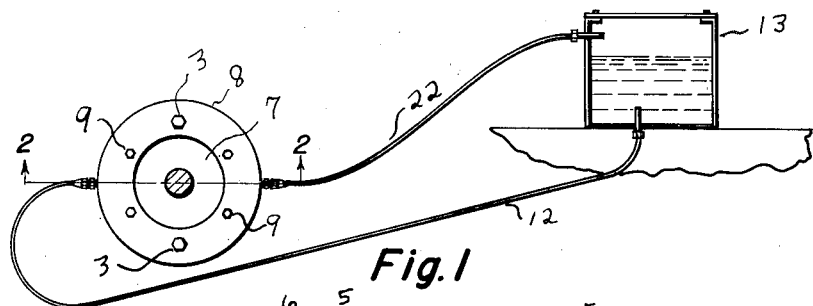
Figure 1 is a top plan view of the device.

Referring now more particularly to the drawings, the numeral 1 designates the slush pump housing and the numeral 2 indicates a piston rod collar adapted to be bolted, by means of the bolts 3, 3 to the housing 1. A piston rod 4, leading to the piston (not shown) passes axially through the housing 1 and collar 2, the axial passageway in the housing 1 being enlarged to form the shoulder 5, 5 against which the packing material 6 abuts when packed into the space between the piston rod and the walls of the said axial passageway. A flexible diaphragm, preferably formed of rubber, 7, is mounted on the piston rod 4 and is maintained in position on the collar 2 by means of the retainer ring 8 which is secured to the collar by means of the bolts 9, 9.

The collar 2 has the annular projection 10 on one end wall thereof which extends into the enlarged passageway in the housing 1 and is adapted to abut against the packing material 6 and, by means of the bolts 3, 3, be maintained firmly in contact therewith.

The axial passageway of the collar 2 is slightly enlarged at the end opposing said annular projection 10, forming a pocket 11, and the wall of said collar 2 is beveled outwardly to the point corresponding to the inside wall of the ring 8.

A pipe line, 12, leads from a reservoir 13 into one side of the collar 2, and is in connection with the passageway 14 leading from said line 12 through the collar 2 to the chamber 24. The

2 passageway 14 is enlarged at its outer end and has the internal threads 15 to receive the connection 16. Adjacent said threaded portion of the passageway 14 is a check valve, such as the ball 17 adapted to fit into the internal end of the connection 16 when in one position and to abut against the stop 18 when in the other position.

A passageway 19 extends transversely through the collar 2 directly opposite the passageway 14, and is enlarged at its outer end forming a chamber 23 which is internally threaded at its outer end to receive the external threads of the connection 20. A transverse slot in the inner end of said connection prevents the ball 21 from forming a seal against the flow of oil into the line 22.

Figure 2:
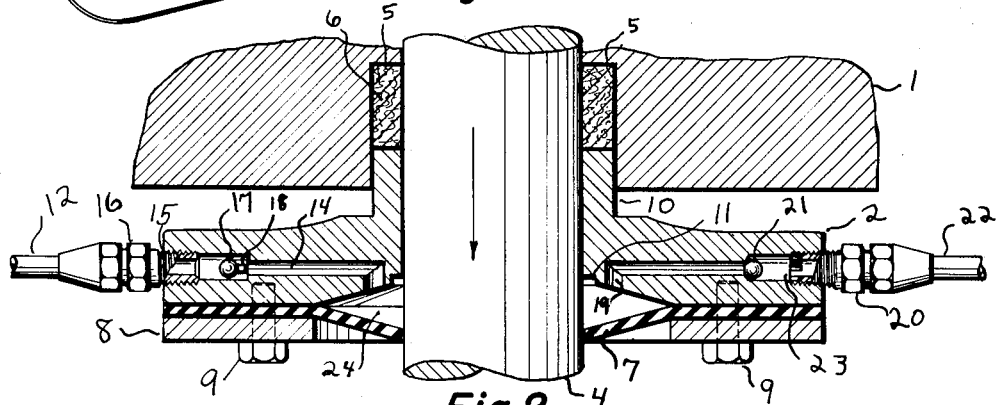
Figure 2 is a cross sectional side elevational view taken on the line 2—2 of Figure 1, showing the diaphragm in one position.
Figure 3:
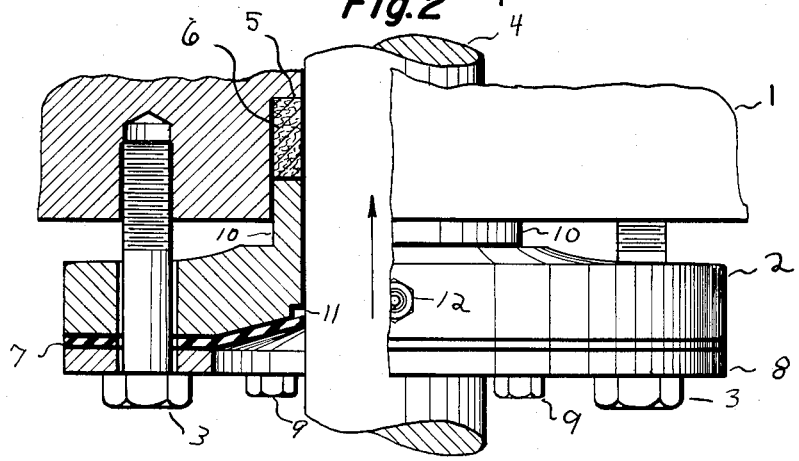
Figure 3 is a side elevational view, partly in cross section, showing the diaphragm in another position and showing the means for maintaining the device on the pump housing.

As the piston rod moves outwardly in the direction shown by the arrow in Figure 2, the rubber diaphragm 7, which fits snugly on the rod 4, will be moved outwardly with the rod and will exert a suction on the lines 12, 22, causing the ball 17 to move against the stop 18, and drawing oil through the line 12 into the area 24 around the piston rod. The ball 21 will be drawn against the outer opening of the passageway 19 and will prevent oil from being drawn through the line 22 into the line 19. Upon the return stroke of the piston, the rod 4 will move in the direction of the arrows shown in Figure 3, and the diaphragm 7 will be moved with the rod 4 into the position shown in Figure 3 and the oil in the chamber 24 will be forced into the lines 14, 19, and the ball 17 moved against the passageway through the connection 16, blocking movement of oil through the line 12 and the ball 21 will be moved against the inner end of the connection 20 and the oil will pass through the slots in said connection 20, and through the line 22 back into the reservoir 13. The rod 4 will thus be lubricated by constantly circulating oil, and the contacting edge of the diaphragm will act as a wiping means, preventing excess oil from passing out of the chamber 24 along the piston rod 4, the slightly enlarged axial walls provided by the pockets 11 permitting the diaphragm 7 to perform the wiping operation upon return stroke of the piston rod without damage to the diaphragm.

The embodiments of the invention herein shown and described are to be regarded as illustrative only, and it is to be understood that the invention is susceptible to variations, modification and change within the scope of the appended claims.

What I claim is:

1. A self-lubricating piston rod comprising a reciprocating piston rod, packing means through which said rod reciprocates, a collar having an annular projection adapted to be maintained tightly in contact with said packing means, a transverse passageway through said collar through which lubricating oil may flow, a chamber within said collar, and a flexible diaphragm maintained on said collar and embracing and in contact with and adapted to be frictionally actuated by said piston rod within said chamber.

2. A self-lubricating piston rod comprising a reciprocating piston rod, a packing means through which said rod reciprocates, a collar having an annular projection adapted to be maintained tightly in contact with said packing means, a transverse passageway through said collar through which lubricating oil may flow, a chamber within said collar, a flexible diaphragm maintained on said collar and in frictional contact with and adapted to be actuated by said piston rod within said chamber, and check valves in said passageways directing the flow of lubricant therethrough.

3. A self-lubricating piston rod comprising a piston housing, a reciprocable piston rod, a packing means through which said piston rod reciprocates, a collar mounted on said housing and maintained in close contact around said piston rod, a reservoir of lubricating oil, a conduit leading from said reservoir to said collar, a transverse passageway through said collar connected with said conduit, and flexible means on said collar embracing and being frictionally actuated by said piston rod for maintaining a flow of lubricant through said passageway.

4. In a self-lubricating piston rod, a piston housing, a passageway through said housing, a reciprocable piston rod extending through said passageway and adapted to reciprocate therein, a packing means in said passageway around said piston rod blocking the flow of fluid through said passageway, a collar adjacent said packing means and in contact therewith, a flexible diaphragm on said collar having an opening through which said rod reciprocates and by means of which said rod is maintained in frictional engagement with said diaphragm, a lubricating oil reservoir, said collar having a chamber therein in connection with said reservoir through which lubricating oil is circulated upon reciprocation of said rod and flexing of said diaphragm through its frictional engagement with the reciprocating piston rod.

5. A self-lubricating piston rod assembly comprising a piston housing, a port in one wall of said housing, a reciprocable piston rod extending through said port, a resilient packing means mounted in said port through which said piston rod reciprocates, a collar mounted on said housing around said piston rod, an annular projection on said collar adapted to abut against and compress said packing means, an oil reservoir, a lubricating chamber in said collar, a fluid conduit leading from said reservoir to said chamber and a fluid conduit leading from said chamber to said reservoir, check valves in said conduits, and a flexible diaphragm embracing said piston rod and anchored to said collar, a portion of said diaphragm forming one wall of said lubricating chamber, said portion of said diaphragm being adapted to be moved by the piston rod to draw oil from the reservoir into the chamber on one stroke of said piston rod and to force said oil back into said reservoir on the return stroke of said piston rod.

6. In a reciprocating piston rod lubricator, a piston rod housing, a collar adapted to be mounted on said housing, packing means between said housing and collar, a lubricant reservoir, conduits leading out of and into said reservoir, and into and out of said collar, an internal chamber in said collar, a flexible diaphragm mounted on said collar and extending into said chamber, an axial port in said diaphragm through which the piston rod reciprocates and which is frictionally carried by the said piston rod effecting a pumping of the lubricant from said reservoir into and out of said chamber through said conduit.

THEODORE R. RYMAL.

REFERENCES CITED

The following references are of record in the file of this patent:

UNITED STATES PATENTS

| Number | Name | Date |
|---|---|---|
| 332,675 | Ott | Dec. 15, 1885 |
| 450,518 | Mayer | Apr. 14, 1891 |
| 467,389 | Weisel | Jan. 19, 1892 |